US009243546B2

(12) United States Patent
Palm

(10) Patent No.: US 9,243,546 B2
(45) Date of Patent: Jan. 26, 2016

(54) COOLING MODULE FOR INTERNAL COMBUSTION ENGINES

(71) Applicant: AUTOKUHLER GMBH & CO. KG, Hofgeismar (DE)

(72) Inventor: Hans Jürgen Palm, Vellmar (DE)

(73) Assignee: AUTOKUHLER GMBH & CO. KG, Hofgeismar (DE)

( * ) Notice: Subject to any disclaimer, the term of this patent is extended or adjusted under 35 U.S.C. 154(b) by 0 days.

(21) Appl. No.: 14/250,921

(22) Filed: Apr. 11, 2014

(65) Prior Publication Data

US 2014/0305391 A1 Oct. 16, 2014

(30) Foreign Application Priority Data

Apr. 12, 2013 (DE) .................... 20 2013 101 570 U

(51) Int. Cl.
F01P 11/02 (2006.01)
B60K 11/04 (2006.01)
F01P 3/18 (2006.01)

(52) U.S. Cl.
CPC ................. *F01P 11/02* (2013.01); *B60K 11/04* (2013.01); *F01P 2003/182* (2013.01)

(58) Field of Classification Search
CPC ....... F28D 1/0426; F28D 1/0333; F28D 9/00; F28F 9/002; F28F 11/00; F28F 21/00
USPC ........ 123/41.01, 41.51; 165/77, 86, 173, 181, 165/149, 51, 140, 153
See application file for complete search history.

(56) References Cited

U.S. PATENT DOCUMENTS

| | | | | |
|---|---|---|---|---|
| 4,095,646 A * | 6/1978 | Granetzke | ................. | F28F 9/00 165/166 |
| 4,473,111 A * | 9/1984 | Steeb | ................... | F28D 9/0062 165/153 |
| 5,148,863 A * | 9/1992 | Fouts | ................... | F28D 1/0333 165/144 |
| 6,105,660 A * | 8/2000 | Knurr | ...................... | F01P 3/18 165/140 |
| 7,036,570 B2 * | 5/2006 | Korth | .................. | F28D 1/05383 165/173 |
| 7,128,178 B1 * | 10/2006 | Heinle | ................... | B60K 11/04 165/41 |
| 8,162,084 B2 * | 4/2012 | Iwanaka et al. | .......... | 180/65.235 |
| 8,162,087 B2 * | 4/2012 | Kobayashi | ............. | B60K 11/08 165/149 |
| 8,215,015 B2 * | 7/2012 | Lesage | ................. | B21D 53/085 165/153 |
| 8,631,859 B1 * | 1/2014 | Hettrich | ................ | F28F 9/0226 165/144 |
| 2001/0050160 A1 * | 12/2001 | Ozawa | ................... | B60K 11/04 165/67 |
| 2002/0056541 A1 * | 5/2002 | Kokubunji | ............. | B60K 11/04 165/67 |
| 2002/0104491 A1 | 8/2002 | Izumi | | |
| 2009/0078394 A1 * | 3/2009 | Weatherup | ............. | B60K 11/04 165/51 |
| 2013/0264039 A1 * | 10/2013 | Kis | ....................... | F28D 1/0443 165/173 |

* cited by examiner

Primary Examiner — Lindsay Low
Assistant Examiner — Long T Tran
(74) Attorney, Agent, or Firm — Thomas, Karceski & Karmilovich, PC

(57) ABSTRACT

The present invention relates to a cooling module for internal combustion engines, in particular of construction and/or mining machines, having at least one submodule with at least two heat exchangers arranged in a plane, wherein each of the heat exchangers has a network of passages for a medium to be cooled and passages for a cooling medium and manifolds for supplying and discharging the medium to be cooled, wherein the heat exchangers of the at least one submodule are interconnected via at least one connecting element through which the medium to be cooled can flow and the at least one submodule has a frame in which the interconnected heat exchangers are releasably mounted.

13 Claims, 6 Drawing Sheets

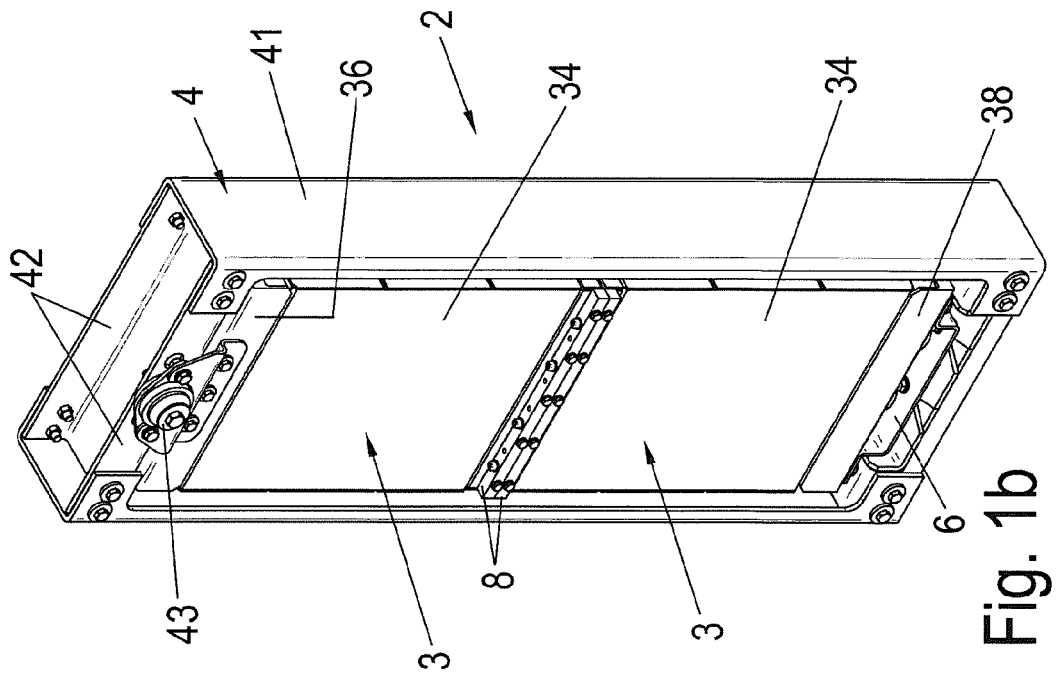
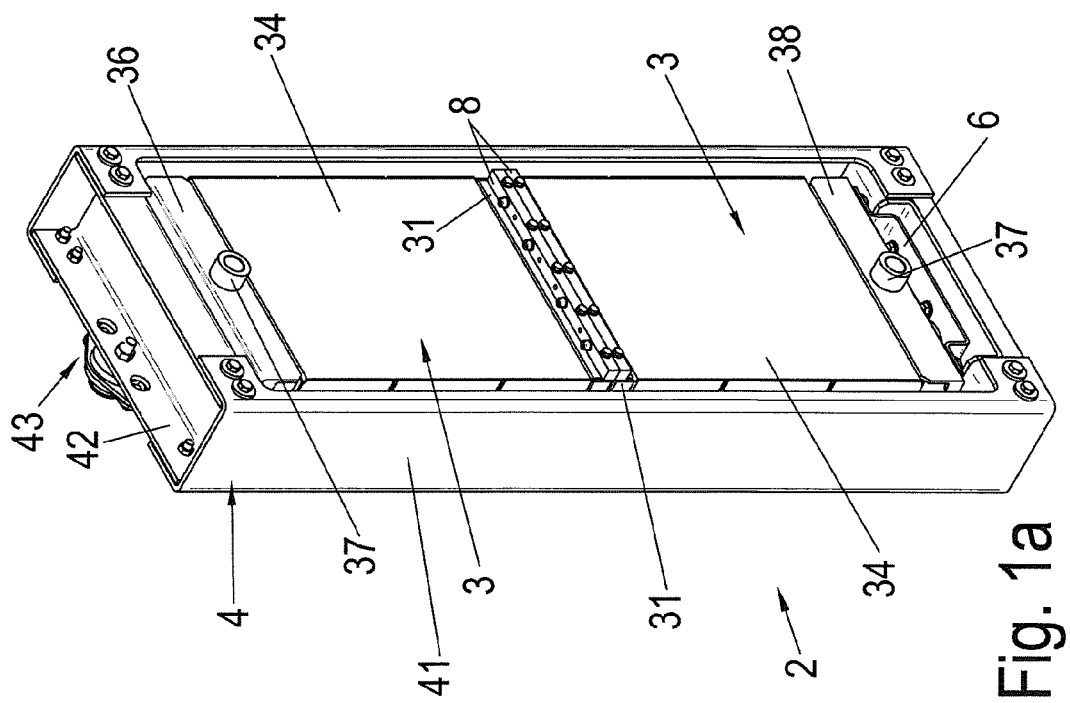

COOLING MODULE FOR INTERNAL COMBUSTION ENGINES

CROSS-REFERENCE TO RELATED APPLICATION(S)

This application relies for priority on German Patent Application No. 20 2013 101 570.9, having an filing date of Apr. 12, 2013, the entire contents of which are incorporated herein by reference.

FIELD OF THE INVENTION

The present invention relates to a cooling module for internal combustion engines, in particular of construction and/or mining machines.

DESCRIPTION OF THE RELATED ART

Cooling modules of the type in question are known in numerous embodiments from the prior art. Such cooling modules are composed of at least one submodule with one or more heat exchangers. Here, the medium to be cooled is generally water, oil or charge air which is usually cooled with air.

The cooling module or the heat exchangers must be frequently cleaned in the course of their life cycle, which requires a complicated dismantling of cooling module parts in order that it is also possible, in the case of heat exchangers arranged behind one another, as described, for example, in a cooling module disclosed in US 2002/0104491 A1, to clean the gaps between the individual heat exchangers or else the rear heat exchangers and carry out maintenance thereon.

SUMMARY OF THE INVENTION

A further problem of cooling modules of the type in question is that, precisely in the case of large construction and/or mining machines, large-area cooling modules have to be installed, which modules are composed of a plurality of individual heat exchangers, wherein, depending on the arrangement of the heat exchanger in the cooling module, the exchange of individual heat exchangers requires a complicated demounting or mounting of a new heat exchanger.

The object of the present invention is to provide a cooling module for internal combustion engines, in particular of construction and/or mining machines, which is compact in structure and easy to clean and to maintain. This object is achieved by a cooling module for internal combustion engines having one or more features enumerated herein.

In the cooling module according to the invention, which has at least one submodule with at least two heat exchangers arranged in a plane, wherein each of the heat exchangers has a network of passages for a medium to be cooled and passages for a cooling medium and manifolds for supplying and discharging the medium to be cooled, the heat exchangers of the at least one submodule are interconnected by at least one connecting element through which the medium to be cooled can flow. Here, the at least one submodule has a frame in which the interconnected heat exchangers are releasably mounted.

The connection of the heat exchangers via at least one connecting element makes it possible to assemble a submodule from a plurality of individual, in particular identical, heat exchangers, with the result that submodules of different lengths can be produced in a simple manner.

Furthermore, such a construction of submodules considerably reduces the need for different replacement parts.

A further advantage of the cooling module according to the invention is that the exchange of individual heat exchangers is made possible in a simple manner, so that if a portion of the submodule is damaged, it is not necessary to exchange the entire submodule, but only the damaged or defective heat exchanger.

Advantageous embodiment variants of the invention are the subject matter of the subclaims.

In an advantageous embodiment variant of the invention, the cooling module has a plurality of submodules with respective heat exchangers.

This makes possible a variable use of such cooling modules in which submodules, for example for cooling charge air, can be arranged next to submodules for cooling a cooling liquid or oil.

According to a further advantageous embodiment variant of the invention, the submodules are arranged behind one another in a plurality of planes, wherein the submodules arranged in adjacent planes can preferably be interconnected in a pivotable manner.

This makes possible a so-called side-by-side arrangement of the individual submodules in a plurality of planes, in which the individual planes are simply and quickly accessible by folding out the planes relative to one another and can thus be easily cleaned and maintained.

Exchanging individual submodules or individual heat exchangers which lie in a rear plane, relative to the position of a maintenance engineer, is also possible in a simple manner without having to demount the entire cooling module.

According to a further preferred embodiment variant of the invention, fastening means are provided on manifolds (referred to below as connecting manifolds), which are adjacent in the mounted state, of the heat exchangers of a submodule, by which fastening means the adjacent connecting manifolds can be releasably fixed to one another.

These fastening means are preferably connecting strips which can preferably be screwed to one another.

To simplify the mounting of two heat exchangers assembled via the connecting elements, one of two connecting strips situated one on the other, for example an upper connecting strip, has at least two threaded holes into which there can be screwed a screw by means of which the connecting strips situated one on top of the other can be pressed apart.

The heat exchangers are in this case preferably designed as crosscurrent heat exchangers whose space requirement is very low on account of the plate construction of such heat exchangers and makes possible a compact construction of the cooling module.

BRIEF DESCRIPTION OF THE DRAWINGS

Exemplary embodiments of cooling modules according to the invention will be described in more detail below with reference to the appended drawings, in which:

FIGS. 1a and 1b show a perspective view of an embodiment variant of a submodule according to the invention.

DETAILED DESCRIPTION OF EMBODIMENT(S) OF THE INVENTION

Figure 2:
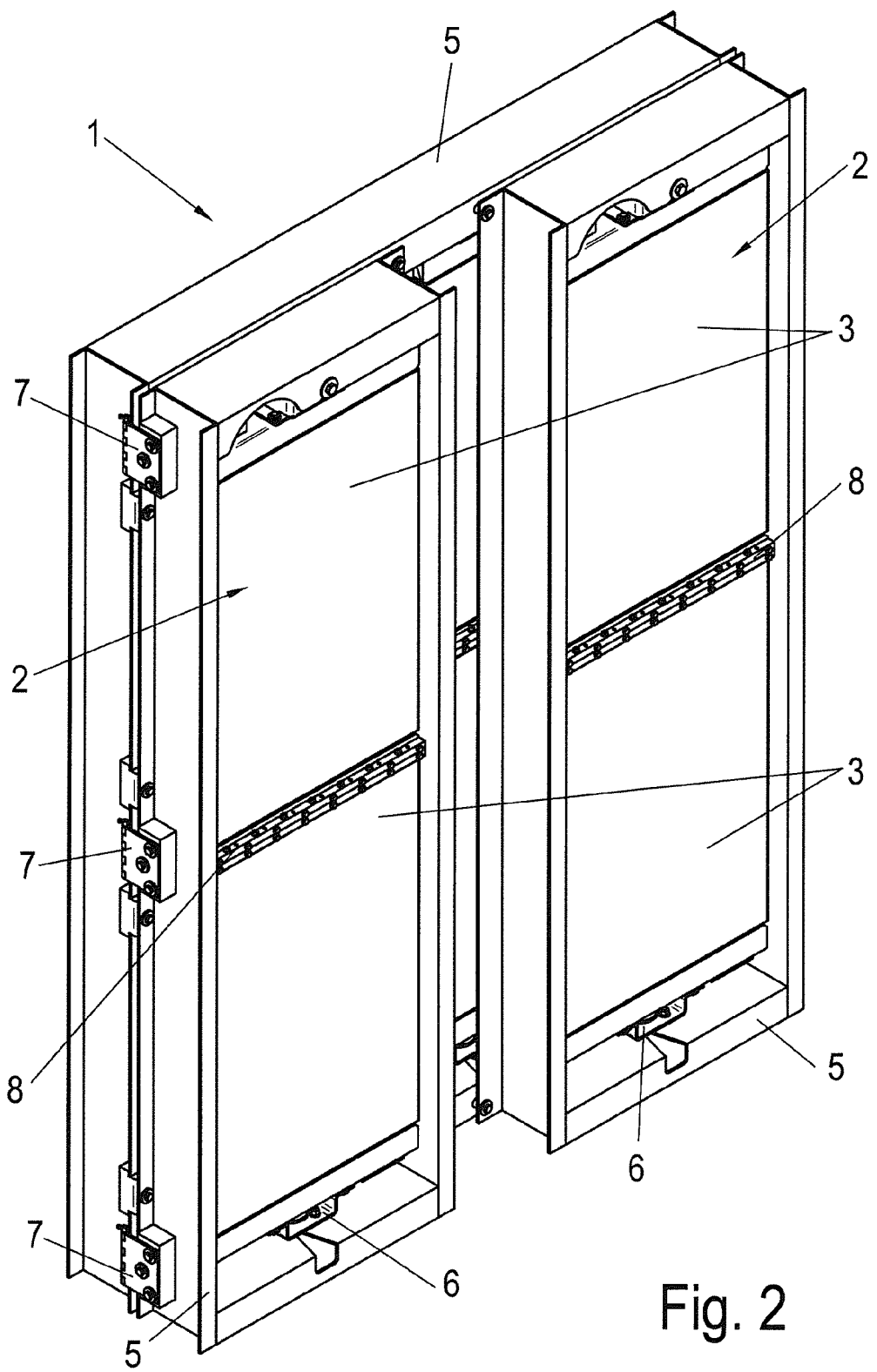
FIG. 2 shows a perspective view of a cooling module, comprising four submodules, arranged in two planes, in the folded-up state.

In the following description of the figures, expressions such as top, bottom, left, right, front, rear, etc. relate exclusively to the exemplary illustration and position of the cooling module, submodule, heat exchanger, manifold and the like selected in the respective figures. These expressions are not to be understood as restrictive, that is to say these references may change as a result of different operating positions or the mirror-symmetrical configuration or the like.

In FIGS. 1a and 1b, an embodiment variant of a submodule of a cooling module 1 is designated overall by the reference sign 2. The submodule 2 here has two heat exchangers 3 arranged in a plane.

Here, each of the heat exchangers 3 substantially comprises a network of passages for a medium to be cooled (such as, for example, oil, coolant, charge air, fuel) and passages for a cooling medium, such as, for example, air, and manifolds 31, 36, 38 at sides of the network 34, which are opposite one another in the direction of passage of the medium to be cooled, for supplying and discharging the medium to be cooled. Here, the heat exchangers 3 are preferably designed as crosscurrent heat exchangers.

The height h of such a submodule here is preferably more than 1500 mm, as required in particular in applications in the construction machine and mining industry sectors.

Figure 5:
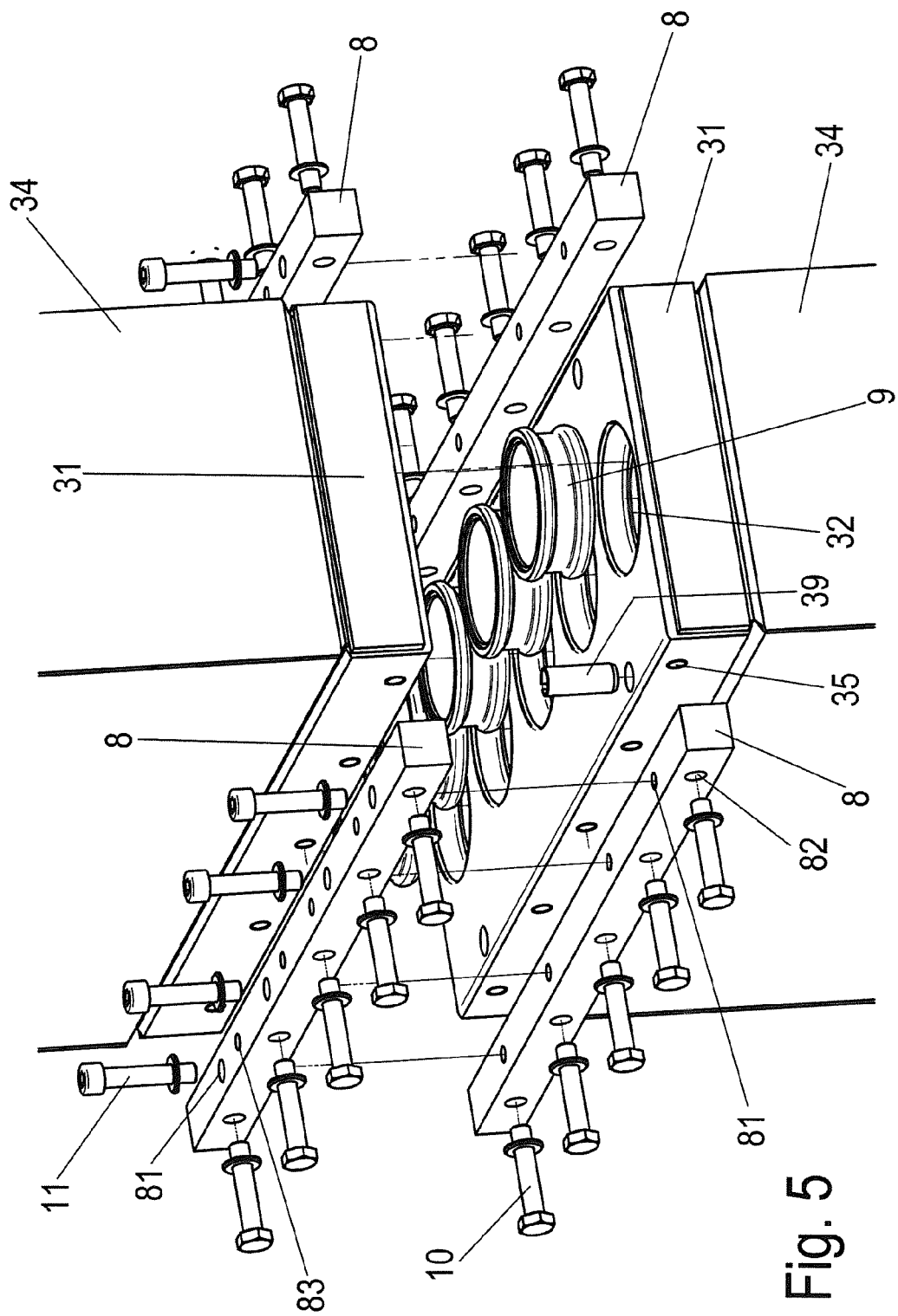
FIG. 5 shows a perspective view of the connecting region of two heat exchangers to be interconnected.

As is shown in particular in FIG. 5, the mutually facing connecting manifolds 31 of adjacent heat exchangers 3 of the submodule 2 are interconnected via at least one connecting element 9 through which the medium to be cooled can flow. The number of the connecting elements 9 arranged between two connecting manifolds 31 here varies with the dimensions of the heat exchangers 3. To facilitate the mounting and exact positioning of the connecting manifolds 31 on one another, holes 33 in which guide sleeves 39 are received are provided on mutually opposite surfaces of the connecting manifolds 31.

In order to receive the connecting elements 9, receiving openings 32 are provided in mutually facing surfaces of the connecting manifolds 31, into which openings there are inserted the, preferably tubular, connecting elements 9 for connecting two heat exchangers 3. The connecting elements 9 here preferably consist of a plastic having a sealing lip provided on the outer lateral surface and are preferably designed in such a way that they are capable of compensating for an offset of the connecting manifolds 31 with respect to one another and thus allow a flexible connection of the connecting manifolds 31 of adjacent heat exchangers 3.

Furthermore, the heat exchangers 3 interconnected in such a way are releasably mounted in a frame 4, 5. The frame 4 shown in FIGS. 1a and 1b here consists of a plurality of frame parts 41, 42 which are screwed, welded or riveted to one another; the frame 5 of the cooling module 1 according to FIGS. 2 and 3 is preferably designed in one piece or likewise consists of frame parts which are preferably screwed, welded or riveted to one another.

Figure 3:
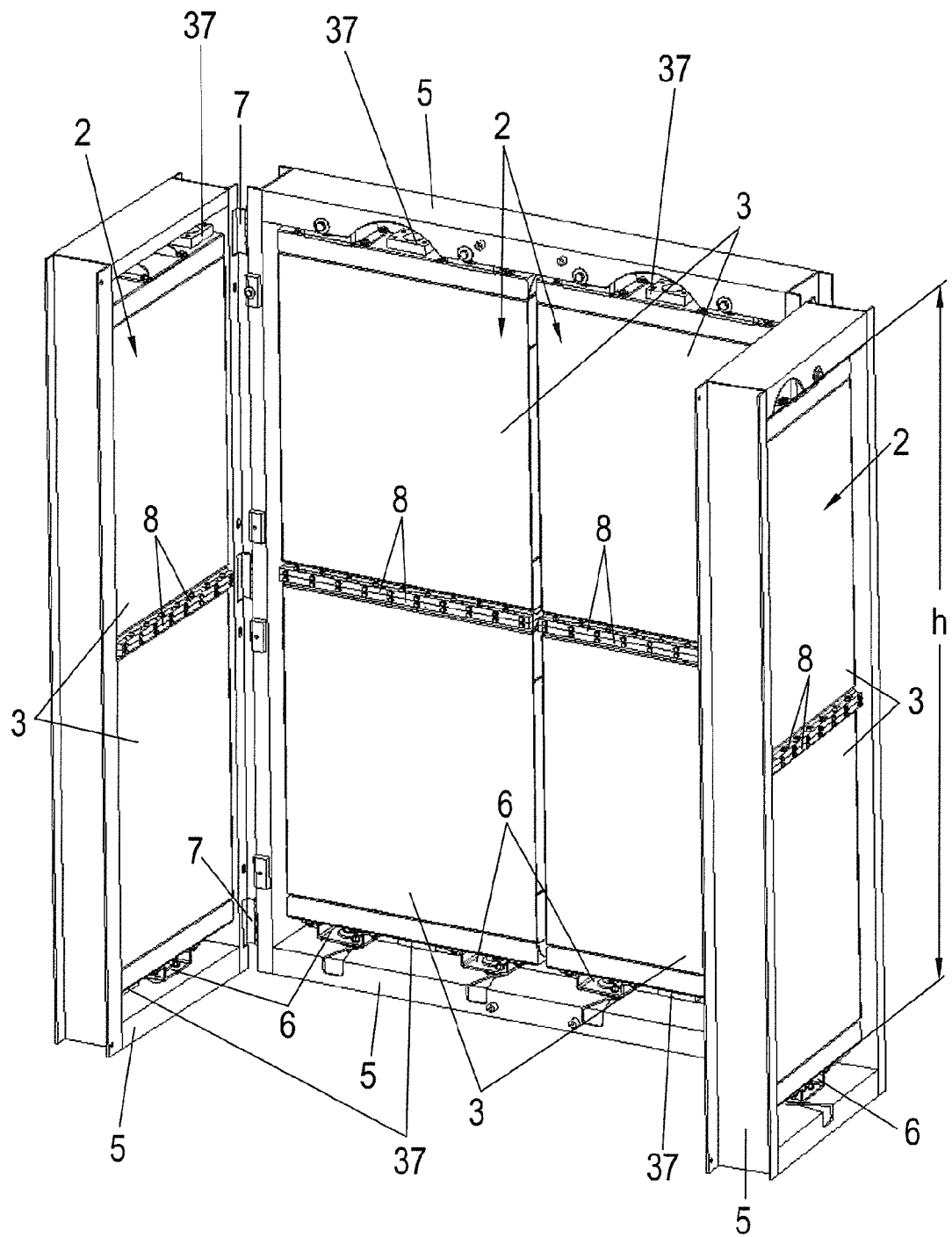
FIG. 3 shows a perspective view of the cooling module from FIG. 2 in the folded-out state.
Figure 4:
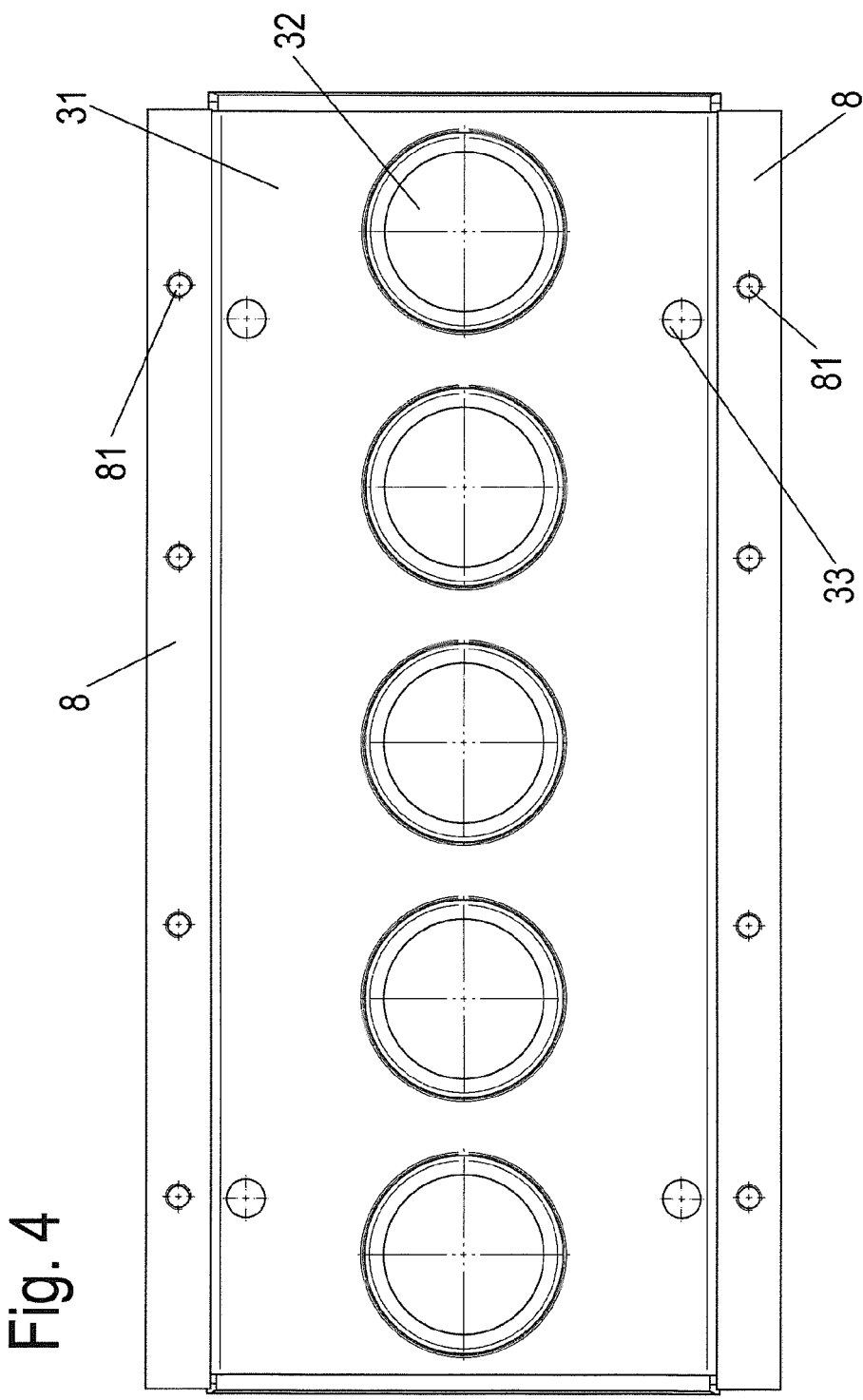
FIG. 4 shows a plan view of a connecting 5 manifold of a heat exchanger in the openings for inserting the connecting elements for connecting to the connecting manifold of a second heat exchanger.

As is shown in FIGS. 2 and 3, this embodiment variant of the cooling module has a plurality of submodules 2 with the respective heat exchangers 3, wherein two of the submodules 2 are accommodated in a frame 5 in a plane and two further submodules 2 are arranged in a second plane in respective frames 5 which are pivotably connected, for example via hinges 7, to the frame 5 which accommodates the two first submodules and is at the rear in FIGS. 2 and 3. Also conceivable is the arrangement of further submodules 2, which are likewise connected via hinges 7 to an adjacent frame 5, in one or more further planes behind one another.

The pivotable arrangement of the front submodules 2 on the frames 5 of the rear submodules 2 makes it possible in a simple manner to clean or maintain the rear submodules 2 by virtue of the fact that the front submodules 2 can be folded away laterally such that the rear plane can be easily reached.

In order to avoid damage to the heat exchangers 3 as a result of vibration during the operation of the construction and/or mining machine, the assembled heat exchangers 3 are mounted in an elastically buffered manner in the respective frame 4, 5, for example via rubber buffers arranged on angle brackets 6. In this embodiment variant, the angle brackets 6 also serve to releasably secure the heat exchangers 3 in the respective frame 4, 5. The frames 4, 5 here are preferably designed as steel frames. Also conceivable is the elastically buffered mounting of the frame 4, as shown in FIGS. 1a and 1b, on the machine superstructure (not shown) by means of mounting elements 43.

Inlet/outlet openings 37 for the entry and exit of the medium to be cooled are provided respectively at the uppermost and lowermost manifold 36, 38, as can be seen in FIGS. 1a and 3.

Figure 6A:
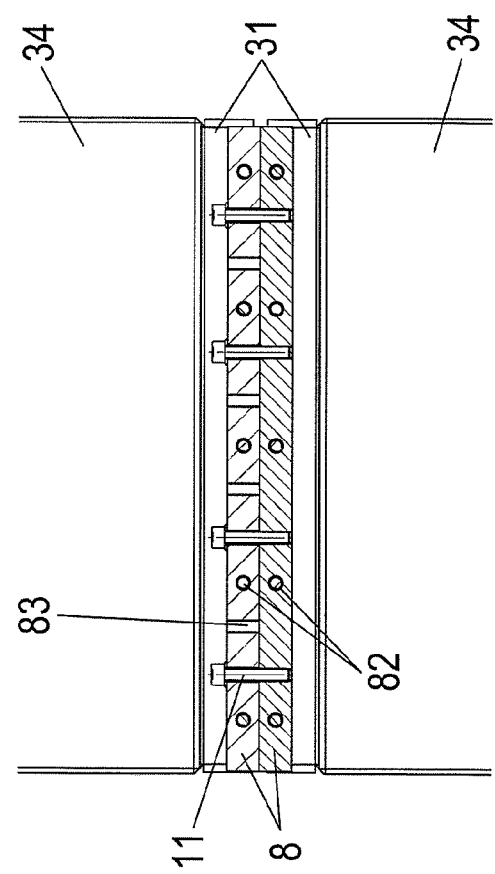
FIGS. 6a and 6b show a front view and a side view of the interconnected heat exchangers from FIG. 5.
Figure 6B:
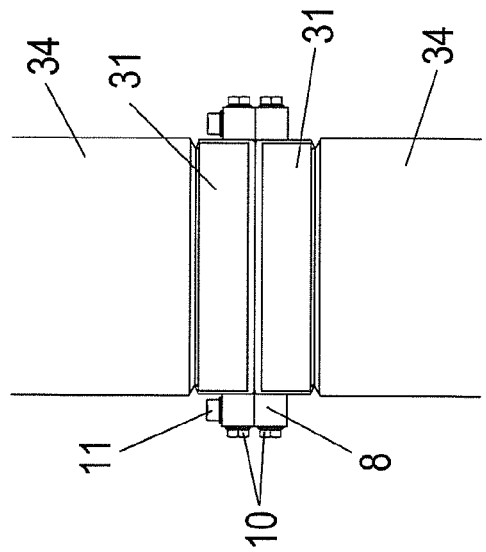

As is shown in FIGS. 5 and 6, fastening means are provided on the connecting manifolds 31, which are adjacent in the mounted state, of the heat exchangers 3 of the submodules 2, by which fastening means the adjacent manifolds can be releasably fixed to one another.

The fastening means are preferably designed as connecting strips 8 which can preferably be fastened laterally to the respective connecting manifolds 31, in particular can be screwed by means of screws 10.

Provided perpendicularly to the screw openings 82 of the connecting strips 8 are further screw openings 81 into which there can be inserted screws 11 for screwing the connecting strips 8 of connecting manifolds 31 situated one on the other, with the result that two adjacent heat exchangers 3 can be releasably fixed to one another via this connection of connecting strips 8 situated one on top of the other.

Respective connecting strips 8 are particularly preferably fastened on opposite longitudinal sides of the connecting manifolds 31.

To simplify the demounting of a submodule 2, in particular to dismantle individual heat exchangers 3, additional threaded holes 83 are provided in the respective upper or lower connecting strips 8, into which holes there are screwed further screws 11 for demounting purposes, wherein the end of the screw 11 facing away from the screw head presses against the surface of the respective other connecting strip 8 such that, during further screwing into this threaded hole 83, the two connecting manifolds 31 are pressed apart, with the result that the connection of the connecting manifolds 31 by the connecting element 9 is also released.

FIGS. 6a and 6b again show, in a front and side view, the connecting manifolds 31, which are interconnected via the connecting strips 8, of the heat exchangers 3 arranged one above the other.

LIST OF REFERENCE SIGNS

1 Cooling module
2 Submodule
3. Heat exchanger

31 Connecting manifold
32 Receiving openings
34 Network
35 Screw hole
36 Upper manifold
37 Inlet/outlet opening
38 Lower manifold
39 Guide sleeve
4 Frame
41 Frame parts
42 Frame parts
43 Mounting element
5 Frame
6 Angle bracket
7 Hinges
8 Connecting strips
81 Screw hole
82 Screw hole
83 Threaded hole
9 Connecting element
10, 11 Screws
h Height of a submodule

The invention claimed is:

1. A cooling module for internal combustion engines, including at least one of construction and mining machines, comprising:
   at least one submodule comprising at least two heat exchangers arranged in a plane, wherein each of the heat exchangers has a network of passages for a medium to be cooled and passages for a cooling medium;
   at least two manifolds for supplying and discharging the medium to be cooled, wherein the at least two manifolds are disposed adjacent to one another in a mutually-facing orientation in a mounted state, wherein each manifold is associated with each heat exchanger, wherein the at least two manifolds are connected to one another in the at least one submodule, and wherein the at least two manifolds each define receiving openings therein;
   at least one connecting element for the medium to be cooled, wherein the at least one connecting element is tubular and interconnects the at least two manifolds by extending between the receiving openings in the at least two manifolds; and
   a frame in which the at least two heat exchangers are releasably mounted.

2. The cooling module according to claim 1, wherein the at least one submodule comprises a plurality of submodules.

3. The cooling module according to claim 2, wherein the plurality of submodules are arranged next to one another in a plane.

4. The cooling module according to claim 3, wherein the plurality of submodules arranged are releasably mounted in the frame.

5. The cooling module according to claim 3, wherein the plurality of submodules are arranged behind one another in a plurality of planes.

6. The cooling module according to claim 5, wherein the plurality of submodules are interconnected in a pivotable manner.

7. The cooling module according to claim 2, wherein the plurality of submodules are mounted in an elastically buffered manner in the frame.

8. The cooling module according to claim 2, further comprising:
   fasteners provided on the at least two manifolds,
   wherein, when the at least two manifolds are disposed adjacent to one another in the mounted state, the fasteners releasably attach the at least two manifolds to one another.

9. The cooling module according to claim 8, wherein the fasteners are screws and the at least two manifolds are attached to one another by the screws.

10. The cooling module according to claim 8, further comprising:
    connecting strips fastened to the at least two manifolds,
    wherein the connecting strips are releasably fixed to one another.

11. The cooling module according to claim 10, wherein one of the connecting strips defines at least two threaded holes for receiving screws, thereby permitting the connecting strips to be pressed apart.

12. The cooling module according to claim 1, wherein the heat exchangers are crosscurrent heat exchangers.

13. The cooling module according to claim 5, wherein the plurality of planes are parallel.

* * * * *